United States Patent Office 3,560,344
Patented Feb. 2, 1971

3,560,344
REDUCTION OF GASEOUS NITROGEN TO AMMONIA
William A. Bulen, Enon, Ohio, assignor to Charles F. Kettering Foundation, Yellow Springs, Ohio, a corporation of Ohio
No Drawing. Continuation-in-part of application Ser. No. 494,947, Oct. 11, 1965, now Patent No. 3,423,289. This application Aug. 29, 1967, Ser. No. 663,982
The portion of the term of the patent subsequent to Jan. 20, 1986, has been disclaimed
Int. Cl. C12d *13/00*
U.S. Cl. 195—50                               10 Claims

ABSTRACT OF THE DISCLOSURE

An organo-metallic catalyst useable in reduction of gaseous nitrogen to ammonia in a system independent of metabolizable carbohydrates and oxygen and requiring 105 Kcal./mole of $N_2$ gas reduced, based on the free energy of hydrolysis of adenosine triphosphate of 7 Kcal./mole, as well as a method of deriving the catalyst from microorganisms grown in nitrogen are described. The production of recoverable ammonia by the chemical reduction of nitrogen gas using this catalyst, an electron donor and a phosphorylating agent in an aqueous media buffered with zwitterionic materials at a pH in the range of 6 to 8, pH 7.25 being optimum is also described.

---

This application is a continuation-in-part of application Ser. No. 494,947, filed Oct. 11, 1965, now U.S. Patent No. 3,423,289, and assigned to the same assignee.

BACKGROUND OF THE INVENTION

This invention relates to an improved system for the production of recoverable ammonia from nitrogen gas by a chemical reduction process utilizing an organo-metallic catalyst system in an aqueous medium of controlled pH, and to methods for deriving the catalyst from microorganisms grown in nitrogen gas.

Commercially, the production of ammonia may be carried out by several processes including the Haber process and the cyanamide process. In the Haber process, elementary nitrogen in the form of atmospheric nitrogen gas and hydrogen gas are reacted at pressures as high at 5000 pounds per square inch and temperatures as high as 500° C. in the presence of inorganic catalysts, such as iron and molybdenum, to produce ammonia directly from the gaseous starting products.

In the cyanamide process, calcium carbide is heated in an atmosphere of nitrogen gas to form a mixture of calcium cyanamide and carbon. The calcium cyanamide is then washed in water to decompose any reactive carbide and then with steam resulting in decomposition of the cyanamide and the evolution of ammonia gas.

Another process for production of ammonia is the Serpek process which consists of heating aluminum ore with carbon in the presence of nitrogen to form an aluminum nitride. Treatment of the nitride with water yields hydrated aluminum oxide and ammonia.

The Haber, cyanamide and Serpek processes are inorganic in nature and relatively expensive to carry out. Ammonia is, however, a fundamental chemical product needed not only as a fertilizer, which requires substantial quantities of ammonia, but is also used in large quantities as a starting product is the synthesis of many organic and inorganic materials, and hence considerable importance attaches to a process which can produce ammonia economically.

"Nitrogen fixation" is a generic term which describes a process by which elemental nitrogen is incorporated into chemical compounds. The Haber, cyanamide and Serpek processes are inorganic processes of nitrogen fixation, but nitrogen fixation also occurs naturally. For example, leguminous plants such as peas, beans and alfalfa, have attached to their roots bacteria containing nodules which are capable of converting atmospheric nitrogen into compounds which are assimilated by the plants. This process is described as symbiosis. Typical examples of symbiotic microorganims which reduce nitrogen gas in the presence of a host plant are Rhizobium and Klebsiella, the latter also being capable of reducing nitrogen in isolated cultures apart from the host plant.

Living cells of certain free-living (non-symbiotic) bacteria and algae are also capable of nitrogen fixation. Typical examples of such free-living microorganisms are aerobic Azotobacter, anaerobic *Clostridium pasteurianum,* and certain blue-green algae.

The ammonia produced in a living organism does not, under normal conditions, exist in a free state for any appreciable time since it is used in the natural synthesis of amino acids and other nitrogen containing materials as quickly as it is produced. For example, alpha-ketoglutaric acid plus ammnoia and either reduced diphosphopyidine nucleotide (DPNH), or reduced triphosphopyridine nucleotide (TPNH), in the presence of glutamic acid dehydrogenase forms glutamic acid and the oxidized form of diphosphopyridine nucleotide (DPN+) or triphosphopyridine nucleotide (TPN+). This process is referred to as reductive amination. Glutamic acid in the presence of transaminases (amino group transferring enzymes) provides a synthesis for the natural production of amino acids by a process termed transamination.

The action of intact living cells in reduction of nitrogen gas to ammonia is fundamentally a metabolic process, and the rate of reduction linked to the rate of growth of the cell. The components of the cell which are active in reduction are, in some cases, bound to insoluble particulate cellular or sub-cellular components, and their type and quantity is fixed to materials occurring naturally within the cell. In the case of aerobic bacteria, the reducing activity of the cell requires the presence of oxygen and a metabolizable carbohydrate such as sucrose and glucose which are acted upon by an enzyme system within the cell. In the case of anaerobic bacteria, a metabolizable carbohydrate and enzymes are still needed. Most important, however, is the fact that nitrogen gas reduction to ammonia carried out within the living intact cell is concurrent with growth, and the ammonia produced is used almost immediately in the amino acid synthesis previously described. For this reason, intact cells, as such are of no utility for the chemical reduction of nitrogen gas to produce recoverable ammonia. While the cell constituents may be degraded to recover ammonia from the components thereof, the ammonia formed in the degradation is the result of chemical decomposition rather than chemical reduction.

The present invention differs substantially from all of the above processes in several material respects. It differs from the Haber process in that it takes place at relatively low temperatures and pressures and is a chemical reduction process catalyzed by an organic catalyst. It differs from the cyanamide or Serpek processes in that it is chemically a reduction process rather than a decomposition process, that is a decomposition of a nitrogen-containing starting product wherein the products of decomposition include ammonia.

The present invention differs from the natural processes of nitrogen reduction in that it is not dependent upon a living system, and substantially all the ammonium ions produced as a result of the chemical reduction of nitrogen gas are recoverable as ammonia rather than being used up, as produced, in the synthesis of amino acids.

The active components of the present invention are free of cellular and sub-cellular constituents of microorganisms and the system does not require metabolizable carbohydrates or oxygen, or the enzymes needed for the conversion of these carbohydrates to products useful in cell metabolism. The amount of active components may be varied widely, a factor not possible in living cells. All other conditions being equal, the method of the present invention is perhaps 200 times faster than that of the living cell.

Further, there is evidence tending to indicate a change in structure of the active material which was originally bound to a cellular or sub-cellular particulate portion of the cell, and thus insoluble, and which has been derived as a soluble material free of particulate components of the cell, and of other enzymes contained within the cell and used in cellular metabolism. Prior to the present invention, the derived active material did not exist as such, notwithstanding extensive activity over the past two or three decades to prepare such a material.

While it is known in the prior art to use crude extracts of the anaerobic bacteria, Clostridium pasteurianum, for reduction of nitrogen gas, the activity of such crude extracts was dependent upon a complex system involving the metabolism of carbohydrate materials in a manner analogous to the metabolic process of the intact cell. Typical metabolizable substrates used were pyruvic acid or alpha-ketobutyric acid, and the metabolism produced hydrogen gas and carbon dioxide by-products. In the absence of the metabolizable carbohydrate, the crude extracts exhibited no $N_2$-reducing activity. Other indications of dependence of this system upon metalobic processes are that no reduction occurred until the pyruvic acid metabolism was started, and that a portion of the ammonia produced was traced to glutamic acid in the reaction vessel, thereby indicating the probable occurrence of a reductive amination reaction as previously described. Such a product and procedure are described in U.S. Pat. No. 3,236,741, issued Feb. 22, 1966.

"Crude extract" for the purpose of this invention and as related to the above system is defined as a mixture of all cellular material released from the cell or extracted therefrom following cell rupture. Such are known to include naturally occurring enzymes for the metabolism of carbohydrates, numerous electron transfer agents including coenzymes and protein bound prosthestic groups plus the complement of enzymes required to maintain the synthetic processes connected with cell growth. $N_2$ reduction by such extracts is known to occur as the result of the compelte metabolism of pyruvic acid, which metabolism involves a number of catalytic components present in these extracts. Among these enzymes are those referred to as constituents of the phosphoroclastic reaction. Also present in this complex mixture is a catalytically active $N_2$-reducing material.

Another material naturally occurring in crude extracts of C. pasteurianum was isolated and identified as a non-heme iron protein of a molecular weight of between 5,000 and 6,000 and including about 5 iron atoms per molecule. This material functioned in the coupling of pyruvic acid oxidation to a number of reducing processes accompanying cellular metabolism and synthesis. The dependence of $N_2$ reduction upon pyruvate metabolism in crude extracts of C. pasteurianum was further clarified to indicate an interaction between the previously identified non-heme iron protein and pyruvic dehydrogenase, also naturally present in the crude extracts, the non-heme iron protein being described as functioning in electron transfer. This function is not specific to the reduction of $N_2$ because it also transfer electrons indiscriminately to other systems, for example, hydrogenase which results in the loss of electrons in the uncontrolled formation of $H_2$. Thus, the electrons used in formation of $H_2$ are not available for $N_2$ reduction.

The present invention is distinguishable from the above described process in that the reducing activity is not linked to or dependent upon a carbohydrate metabolizing system, for either a source of electrons or the non-heme iron electron transfer agent described above. Further, the active $N_2$-reducing component or organo-metallic catalyst in accordance with the present invention is substantially free of other enzymes. Also, absent are those components which give rise to a conversion of the produced ammonium ion into the synthesis of amino acids. Essentially all of the nitrogen gas reduced is recoverable as ammonia rather than being incorporated into amino acids, or other nitrogenous components. This, however, is not intended to preclude the presence or existence of intermediate reduction products such as hydrazine and the like.

The controlling material for carrying out the process of the present invention is an organo-metallic catalyst material derived from $N_2$-reducing microorganisms. The catalyst is free of intact microorganism cells, i.e., "cell-free," and free of cellular and subcellular particulate components, naturally occurring electron donor materials or materials constituting a natural donor system. The activity of the catalyst system of the present invention is independent of carbohydrate metabolism and associated metabolic cell processes and is therefore not a simulated cell process system. For the purposes of the present invention, the essential ingredient of the system may be defined as an organo-metallic catalyst which is believed to perform the functions both of providing a binding site for nitrogen gas and of electron transfer. The catalyst itself is polymeric in nature and includes metallic functional groups selected from the group consisting of iron and molybdenum and combinations thereof. Added to the catalyst material is an electron donor, which in accordance with the present invention is a synthetic electron donor as opposed to the natural donors present in the intact cell, thus overcoming the disadvantage previously noted with regard to indiscriminate electron donors. The other component of the system includes a phosphorylating agent.

More specifically, the catalyst of the present invention includes two enzyme materials the first of which includes non-heme iron and molybdenum in the ratio of 11–16 to 1, and a molecular weight based on one atom of molybdenum per molecule of less than 180,000 and in the range of 100,000 to 120,000. The second enzyme includes non-heme iron, but no molybdenum and has an estimated minimal molecular weight based on two atoms of iron per molecule of between 30,000 to 40,000.

The catalyst system operates in a buffered aqueous medium to reduce gaseous nitrogen and preferably includes a zwitterionic material for providing a pH in the range of 6 to 8 with 7.25 being optimal.

Accordingly, it is an object of the present invention to provide a method for the chemical reduction of nitrogen gas to ammonia by the use of an organo-metallic catalyst system utilizing a catalyst material as above described, and wherein the method is independent of a metabolizable carbohydrate system and is carried out at atmospheric pressure and a temperature below the decomposition temperature of the catalyst material.

Another object of the present invention is the provision of an improved process for deriving an organo-metallic catalyst material from nitrogen reducing microorganisms.

Another object of the present invention is the provision of a method for the chemical reduction of nitrogen gas as above described wherein the catalyst system includes adenosine triphosphate present in an amount sufficient to provide at least 15 moles thereof for each mole of nitrogen gas reduced to $NH_3$.

Another object of the present invention is the provision of an improved buffer system of controlled pH for the catalytic reduction of nitrogen gas to ammonia.

Other objects and advantages of the present invention will be apparent from the following description and the appended claims.

The organo-metallic catalyst for use in accordance with the present invention is derived from a nitrogen fixing organism grown on nitrogen gas, for example, Azotobacter cultures grown on nitrogen gas for approximately sixteen hours. The various species of Azotobacter which may be utilized include *A. agilis, A. vinlandii,* and *A. chroococcum.*

A typical procedure for the production of the catalyst in accordance with the present invention is as follows: Cells were initially separated from liquid cultures with a Sharples centrifuge which sedimented a paste material as a solid component. The paste material was suspended in 0.025 M potassium phosphate at pH 7 using a ratio of 22 grams of paste to 60 milliliters of the potassium phosphate buffer solution. Potassium phosphate was used since the organo-metallic catalyst appeared to be more stable in a solution of this material. The resulting mixture was then passed through a pre-cooled French pressure cell which ruptured substantially all of the cells present to provide a crude extract including cellular and sub-cellular particulate components, nucleic acid material, membranes, microsomes and a "soluble fraction" including some solubilized enzymes and nucleic acids. After treatment in the French pressure cell, the mixture was centrifuged at $10,000 \times g$ for twenty minutes to remove any remaining intact cells and cell wall fragments. The supernatant is a colloidal suspension containing sub-cellular components, numerous soluble enzymes and some microscopically detectable cell components, the latter being removed by centrifuging at $144,000 \times g$ for thirty minutes.

The supernatant of the second centrifuging operation, including soluble enzymes and materials bound to small cellular particulate components, hereinafter referred to as Fraction 1, showed the presence of a material including peptide linkages or bonds and the catalyst material of the present invention. The test for the peptide linkages were conducted using a biuret reagent, that is, a copper sulfate reagent which reacts with the peptide bonds to produce a color which is proportional to the number of peptide bonds present in the molecule. The reagent used was that reported by Gornall et al., J. Biol. Chem. 177,751 (1949). Prior to using the biuret reagent, samples of Fraction 1 were treated with desoxychloate to dissolve any small particulate material present. The standard used in the colorimetric measurement was crystalline bovine serum albumen. An absorbance value of 0.09 at wavelength of 5400 A. was equivalent to one milligram of protein. The results of this analysis were used as a basis for calculations used in the remaining steps, in that the amounts of protein in Fraction 1 (referred to as Fraction 1 basis) formed the basis for the amounts of other materials added during the sequence.

To each gram (Fraction 1 basis) of Fraction 1 was added about 8 milliliters of freshly prepared protamine sulfate solution at pH 6. The required amount varies somewhat depending upon the source and state of purity of the reagent. The protamine sulfate solution was added slowly with gentle mechanical stirring, and the mixture was allowed to stand for approximately fifteen minutes until the complexing action to be described hereinafter was completed.

Protamine sulfate is a basic protein derived from whale sperm, and aqueous solution of the sulfate are strongly acidic. Accordingly, the protamine sulfate was first dissolved in water to give a 2% solution. The pH of the aqueous solution was then adjusted to 6 using 1.0 N sodium hydroxide and the resulting mixture was centrifuged to remove any solid precipitate. The clear supernatant liquid formed the protamine sulfate solution used in the above procedure. It is preferred that the supernatant be treated by mechanical stirring under a stream of argon to remove dissolved oxygen.

Fraction 1 contains nucleic acids and the nitrogenous organo-metallic catalyst bound to a sub-cellular component in addition to other materials such as other enzymes. In this step, the function of the protamine sulfate described above is to form a complex with the nucleic acid portion of Fraction 1, the nucleic acid-protamine complex being insoluble and separable therefrom by centrifugation. Thus, following the addition of protamine sulfate, the mixture was centrifuged, and the supernatant was removed from the nucleic acid-protamine complex. This supernatant will be referred to hereinafter as Fraction 2.

It was determined that Fraction 2 included a mixture of proteins having a net negative charge and proteins having a net positive charge. Also in this mixture was the organo-metallic catalyst of the present invention still apparently bound or associated with a sub-cellular particulate component in colloid suspension. Accordingly, by adjusting the pH of Fraction 2 to 6.5 using a 0.5 N acetic acid solution, and using the protamine sulfate solution previously described, the organo-metallic catalyst of the present invention and a portion of the proteins of net negative charge were separated from the mixture.

By treating Fraction 2 at pH 6.5 with about 1.8 milliliters (variable as noted above) of the protamine sulfate solution described above, per gram of protein (Fraction 1 basis), a protamine complex is formed with a portion of the net negatively charged proteins including the organo-metallic catalyst of the present invention. The thus formed protamine complex was insoluble in an aqueous medium and was separated from the remaining liquid by centrifugation. The solid precipitate, hereinafter referred to as Fraction 3, was then suspended in an argon-saturated .025 M aqueous potassium phosphate buffer solution of pH 7.0. It is also possible to use 0.01 M potassium phosphate buffer at pH 7. Since Fraction 3 exhibits some sensitivity to oxygen, anaerobic conditions were observed from this point on in the procedure.

Fraction 3 was then treated with 80 milligrams of purified cellulose phosphate per gram of protein (Fraction 1 basis) and the mixture was stirred mechanically. Optionally, the amount of cellulose phosphate may be increased to 100 mg./gm. of protein. The cellulose phosphate reacts with the protamine liberating the materials which had previously been complexed with the protamine. The liberated material was soluble in the aqueous medium and dissolved, while the protamine-cellulose phosphate complex was insoluble. The latter solid complex was removed from the mixture by passing it through a column which contained a plug of glass wool or a fritted glass disk at the bottom, and the solution which passed through the column was collected. The column was then washed with 0.025 M aqueous potassium phosphate buffer solution of pH 7.0. and the pass-through and wash solutions, identified as Fraction 4, were combined for further processing.

The cellulose phosphate was regenerated from the protamine-cellulose phosphate complex by washing the complex with dilute hydrochloric acid to regenerate the cellulose phosphate which was then washed in water to remove traces of the acid, dried and triturated. If desired, dilute sulfuric acid may be used in place of the hydrochloric acid.

The above described separation of proteins, a significant feature of the present invention, is a relatively simple and practical method for achieving separation of net negatively charged proteins from a mixture including net positively charged proteins. The simplicity of the system resides in the fact that the net negatively charged proteins which react to form a complex with the protamine may be easily regenerated by reacting this complex with cellulose phosphate which then forms a protamine-cellulose phosphate complex which is insoluble in the aqueous medium under the conditions given.

Fraction 4 was then separated into several components by column chromatography using an anion exchange column, i.e., a diethylamino ethyl (DEAE) cellulose column measuring 1.8 by 25 centimeters which had been previously equilibrated with a 0.025 M aqueous potassium phosphate buffer solution of pH 7.0. Fraction 4 was then introduced into the column and separated by eluting the column with a salt solution under conditions to bring about separation of Fraction 4 into its component parts. The elution procedure used was that of gradient elution using 250 milliliters each of 0.15 and 0.7 M sodium chloride solution prepared in 0.025 M aqueous potassium phosphate buffer solution of pH 7.0. An alternate elution procedure which may be used is a stepwise elution with increasing salt concentration. The elution procedure produced Fractions 5, 6 and 7, Fraction 5 being a mixture believed to be predominately cytochromes $c_4$ and $c_5$. Fractions 6 and 7 contained the organo-metallic catalyst material of the present invention.

ALTERNATE PROCEDURES (1) An alternate procedure useable for separation of Fraction 4 into its constituent parts included adjusting the pH of Fraction 4 with an argon-saturated 0.5 N acetic acid solution of pH 5.5 to precipitate impurities including cytochrome containing material. The resulting mixture was then centrifuged to remove the solids, and the supernatant liquid was adjusted to pH 7 with an aqueous solution of 0.2 M $K_2HPO_4$, and fractionated on the DEAE cellulose column previously described.

The precipitated impurities correspond to previously described Fraction 5, and the separation on the column was effected by the gradient elution procedure using 250 milliliters each of 0.15 and 0.7 M aqueous chloride solution, prepared as described, to separate Fractions 6 and 7.

(2) Separation of Fraction 4 may also be conducted at room temperature and under anaerobic conditions using a polyacrylamide gel in an apparatus and similar to the method and collection procedures described in Anal. Biochem., 3, 358 (1962); Biochem. Biophys. Acta., 104, 278 (1965). The eluting solvents were sparged with $H_2$ for one to two hours. If desired, 0.1 mg./ml. of dithiothreitol (DTT) may be added after sparging the eluting solvents for 20 minutes, followed by additional sparging for one to two hours. Washing the columns with 400 ml. of $H_2$-saturated solvent rendered them anaerobic.

The cytochrome-containing high molecular weight impurities were removed from Fraction 4 by adding 30 ml. thereof to a 3 x 15 cm. column of 50–150 mesh Bio-Gel P200 beads (exclusion limit of 200,000) previously equilibrated anaerobically with distilled water. Water at a flow rate of 25 ml./hour was used to elute the column and the active components of the present invention migrated with an $R_f$ (ratio of distance travelled by desired components to distance travelled by solvent front) of about 0.35. The excluded components are believed to be high molecular cytochrome materials, while the collected material, Fractions 6–1 and 7–1 (combined) contained the active components.

Fractions 6–1 and 7–1 were separated on a DEAE cellulose column measuring 2.5 x 8.5 cm. having an exchange capacity of 0.95 meq. per gram.

These columns were prepared as follows:

The designated height was that existing after washing the column with 1 N KOH (100 ml.), water (50 ml.), and 0.025 M Tris-HCl, pH 7.2 (300 ml.) without application of external pressure. Reservoirs, one containing 600 ml. of 0.025 M Tris-HCl, pH 7.2; and several others containing 200 ml., respectively, of 0.15, 0.25, and 0.35 M NaCl in the same buffer were connected to the column and sparged with $H_2$. DTT was added as previously described. 600 mg. of Fractions 6–1 and 7–1 were added to the column which had previously been equilibrated with 400 ml. from the buffer reservoir. The column was eluted as follows: (a) 20 ml. of the buffer, (b) 50 ml. of 0.15 M NaCl, (c) 70 ml. of 0.25 M NaCl, and (d) 50 ml. of 0.35 M NaCl, in that order with a flow rate of 35 ml./hr. The column could be reused after regeneration with 0.5 M KOH (100 ml.), $H_2O$ (50 ml.) and 0.025 Tris-HCl, pH 7.2 (300 ml.).

The above gradient elution procedure resulted in separation of two distinct Fractions 6–1 and 7–1, the components of which constitute the active elements of the catalyst system of the present invention. The material eluted with the 0.15 M solvent contained cytochromes and appeared to correspond to Fraction 5. Essentially the same degree of separation may be achieved using a 1.8 x 20 cm. column with a linear NaCl gradient but Fraction 7–1 elutes in a greater volume.

(3) A preferred procedure involves centrifuging Fraction 4 at 144,000×$g$ for twenty minutes, and the supernatant was collected as Fraction 4A.

Fraction 4A was applied to a 3 x 17 cm. column of polyacrylamide gel (Bio-Rad P 150, 50–100 mesh). This is preferred over the P–200 gel because flow rates are difficult to maintain with the latter. The P-150 column was prepared and separation affetced as follows:

(a) The dry gel was soaked in water for twenty-four hours or more.
(b) The column was packed.
(c) 5 to 10 column volumes of $H_2$ saturated water were passed through the column.
(d) Add about 20 ml. of Fraction 4A to column.
(e) Elute with $H_2$ saturated water.

The active components Fraction 4B migrated with $R_f$ values of 0.35, and formed a narrow dark brown visibly discrete band. When eluted, Fraction 4B was collected anaerobically in an argon atmosphere.

Fraction 4B was then treated on a DEAE cellulose column whose size was capacitated to handle 1 gram of Fraction 4B, about 2 x 15 cm., and the volume of eluting solutions were increased proportionally over those previously described. The several fractions recovered corresponded generally to Fractions 5, 6 and 7, supra.

Fraction 6 was further purified by concentration using an ultrafiltration procedure, e.g. using a Diaflo ultrafilter of Amicon Corp. This procedure concentrated 30 ml. of Fraction 6 to 5 to 6 ml. and all of the material having a molecular weight of greater than 10,000 was retained.

Fraction 6A was then treated on a 2.5 x 15 cm. polyacrylamide gel column (Bio-Rad. P 150) and eluted with $H_2$ saturated water containing 0.1 mg./ml. of DTT. The collected material was retained as Fraction 6B.

The components of Fractions 6 and 7 constitute the active elements of the catalyst system of the present invention. Unlike the characteristics earlier noted wherein these materials were bound to or associated with a subcellular particulate component, the active materials constituting these two fractions exhibited the properties of a solubilized protein.

Fraction 6 was obtained as a dark brown solution contained in fractions A, B and C of 10 milliliters each which eluted from the DEAE cellulose column at about 0.2 M sodium chloride by the gradient elution procedure previously described. Colorimetric analysis, using the previously described biuret reagent indicated the presence of peptide linkages, as previously described.

A typical analysis of Fraction 6 showed the presence of carbon, hydrogen, oxygen, nitrogen and sulfur, and provided the data in the following table:

| Fraction: | N-moles,[1] Fe | N-moles,[1] Mo | Milligrams of protein | Fe/protein ratio | Mo/protein ratio | Fe/Mo ratio |
|---|---|---|---|---|---|---|
| A | 4,042 | 263.5 | 48.9 | 82.6 | 5.39 | 15.3 |
| B | 3,070 | 214.3 | 39.6 | 77.5 | 5.41 | 14.3 |
| C | 1,446 | 93.3 | 19.7 | 73.4 | 4.74 | 15.4 |

[1] N-moles=Nanomoles; all data including experimental error of ±2%. Mo assay by a micromodification of the procedure of Clarke et al, Anal. Chem., 27, 2000 (1955); Fe assay by a modification of existing bathophenanothroline procedures of Smith et al, Analyst, 77, 418 (1952), and Peterson Anal. Chem., 25, 1337 (1953); protein assay with the biuret reagent of Gornall et al., supra.

These data indicate an iron content of between 70 to 85 N-moles of iron per milligram of protein, with an average content of 77.8. Molybdenum was present in an amount of between 4.5 to 5.6 N-moles of molybdenum per milligram of protein, with an average content of 5.10. The ratio of iron to molybdenum, based on the above analysis was between 14 and 16 with an average value of 15.0, although analysis following dialysis indicated a lower ratio limit of about 11. Spectrophotometric data established the absence of a typical non-heme iron spectra indicating that all iron is bound directly to protein, that is, non-heme iron.

Based on the molybdenum content of Fraction 6 material, and assuming one molybdenum group per molecule, the molecular weight of the polymeric material in Fraction 6 is less than 180,000.

Fraction 7 which included fractions A, B and C of 10 milliliters each were eluted from the DEAE cellulose column at about 0.37 M sodium chloride by the gradient elution procedure previously described. This fraction, like Fraction 6 showed the presence of non-heme iron but differs from Fraction 6 in that it does not contain molybdenum.

A typical analysis of Fraction 7 showed the presence of carbon, hydrogen, oxygen, nitrogen and sulfur and provided the data in the following table:

| Fraction: | N-moles,[1] Fe | Milligrams of protein | Fe/protein ratio |
|---|---|---|---|
| A | 834 | 15.1 | 55.2 |
| B | 1,214 | 23.8 | 51.0 |
| C | 1,034 | 17.8 | 58.1 |

[1] Assay for Fe and protein as noted earlier.

These data indicate an iron content of between 50 and 60 with an average of about 54.8 N-moles of iron per milligram of protein.

The composition of Fraction 6 is considerably different from known enzyme materials containing non-heme iron and molybdenum, the closest materials being xanthine oxidase, and aldehyde oxidase, each of which includes flavin and the latter also coenzyme Q (ubiquinone) whereas spectral analysis did not indicate the presence of flavin in Fractions 6 or 7. Xanthine oxidase extracted from milk includes 8 moles of iron per 2 moles of molybdenum to provide an iron/molybdenum ratio of 4 to 1. Xanthine oxidase extracted from calf liver possesses an iron/molbydenum ratio of 8 to 1. In the case of aldehyde oxidase extracted from rabbit liver, there are 8 mols of iron for each 2 moles of molybdenum, an iron/molybdenum ratio of 4 to 1.

The non-heme iron compound of Fraction 7 is different from the previously described non-heme iron protein occurring naturally in *C. pasteurianum*. Experimental tests established that the clostridial non-heme iron protein is not required for $N_2$ reduction when artificial electron donors such as sodium hydrosulfite are used. Fraction 7, however, is a necessary component of the catalyst material of the present invention even when sodium hydrosulfite is the electron donor.

The following table indicates the relative ability of the several fractions to reduce nitrogen gas to ammonia wherein specific activity is defined as the millimicromoles of nitrogen gas reduced per minute per milligram of protein based on the weight of the protein for the respective fractions:

| Fraction: | Specific activity |
|---|---|
| 1 | 5–9. |
| 2 | 25–30. |
| 3 | No test since complex is formed. |
| 4 | 40–45. |
| 5 | Ineffective since no catalyst present. |
| 6 | Ineffective alone. |
| 7 | 7.9 (see discussion infra). |
| 6 and 7 | 75–100 or greater (based on weight of Fraction 7). |

It is also to be noted that Fractions 6 and 7 constitute by weight approximately 0.4% of the total cell weight. Even though over 99% by weight of the cell has been removed, Fractions 6 and 7 retained 30% to 40% of the activity of the original crude extract, and the specific activity increased substantially.

A typical procedure for the reduction of nitrogen gas to ammonia was as follows: Reduction reactions were conducted anaerobically in reaction vessels, for example, Warburg flasks, equipped with serum stoppers in the side arms. A phosphorylating agent was added to the side arm and the remaining materials except the electron donor were added to the main chamber. Flasks were evacuated and filled three times with high-purity nitrogen gas, heated at 30° centigrade with shaking for about five minutes, and again evaculated and filled with nitrogen gas. The electron donor was then introduced into the side arm with a hypodermic syringe, and the flasks were filled with nitrogen gas and tipped to introduce the electron donor into the reaction mixture which was agitated for the period of the reaction. During the reduction the temperature was maintained below the decomposition temperature of the catalyst and at essentially ambient conditions while the gas pressure was essentially one atmosphere. The reaction may however be conducted at a higher pressure.

To establish positively that nitrogen gas was in fact being reduced to ammonia, $N_2$ labeled with the mass isotope $N^{15}$ was used. Anaerobic conditions were maintained using helium as a diluent gas and $N_2^{15}$ was added to the desired pressure after the last evacuation.

The preferred system for a thirty minute reaction period included a 2 milliliter reaction mixture made up of 50 micromoles of a potassium cacodylate buffer of pH 7, 40 micromoles of sodium hydrosulfite ($Na_2S_2O_4$) as an electron donor, from 0.5 to 1.0 milligram of Fraction 7, 0.5 milligram of Fraction 6, and a phosphorylating agent generating system including 5 micromoles of $MgCl_2$, 120 micromoles of creatine phosphate, 0.5 milligram of creatine phosphokinase and 10 micromoles of adenosine triphosphate (ATP). Above a ratio of 2 to 1 of Fractions 7 to 6, by weight, the system was saturated, and additional amounts of Fraction 6 did not appreciably alter the reaction. An alternate synthetic electron donor system which was used included hydrogenase, methyl viologen and hydrogen gas.

Ammonia was separated by microdiffusion and determined colorimetrically with Nessler's reagent. The microdiffusion was conducted in 15 milliliter serum bottles fitted with rubber stoppers holding an etched glass rod. One milliliter of saturated $K_2CO_3$ was added to a one milliliter aliquot of a reaction mixture, and the rubber stopper holding the etched rod which had been previously dipped in a N sulfuric acid solution was quickly inserted. Distillation was allowed to proceed for 90 minutes with slow shaking while retaining the mixture at a temperature of about 30° C. The etched tip rod was then placed in a 10 milliliter beaker containing 4 milliliters of Nessler's reagent prepared as described by Johnson, J. Biol. Chem., 137, 375 (1941), and diluted 1:1 with water. Three milliliters of 2 N sodium hydroxide were added, the mixture was stirred, and the etched glass rod removed. After standing 25 minutes at room temperature the absorbance was measured at 4900 A. and ammonia values were obtained from a standard curve.

$N_2^{15}$-incorporation was measured by subjecting samples to micro-Kjeldahl digestion and distillation, using the mercuric oxide catalyst described by Burris et al., Methods in Enzymology, vol. 4, p. 355, Academic Press, Inc., 1957. Ammonia was converted to nitrogen gas by a hypobromite oxidation as described by Glascock, Isotopic Gas Analysis, Academic Press, Inc., 1954, and the $N^{15}$ content was determined by mass spectrometric analysis.

Representative data of $N_2^{15}$ reduction is as follows:

MICROGRAMS OF NITROGEN[15] REDUCED IN 40 MINUTES

| | Nitrogen[15] assay | Ammonia assay |
|---|---|---|
| Test: | | |
| 1 | 84.6 | 82.1 |
| 2 | 88.2 | 82.4 |

The data in the above table which involved a gas phase containing 0.75 atmosphere of nitrogen gas (97% $N^{15}$) and 0.2 atmosphere argon showed that essentially all of the nitrogen reduced could be accounted for as ammonia. Tests were also conducted to determine the rate at which nitrogen gas was reduced, the data being shown in the following table:

| Time in minutes: | Millimoles of nitrogen reduced |
|---|---|
| 10 | 25–30 |
| 20 | 40–50 |
| 30 | 60–70 |
| 40 | 85–90 |
| 50 | 100–110 |
| 60 | 110 |
| 70 | 110 |
| 80 | 110 |

These data indicate that under the conditions described the reaction rate is essentially linear for a thirty minute period and that the reaction is completed at the end of about sixty minutes. Other tests provided data which showed that with optional amounts of reactants, ammonia formation by the organo-metallic catalytic reduction of nitrogen gas is directly proportional to the amount of organo-metallic catalyst present in the reaction vessel.

Utilizing the preferred system for a thirty minute reaction period, Fractions 6–1 and 7–1 combined exhibited a specific activity of 44.9. When separated, the purity of Fraction 6–1 and Fraction 7–1 was estimated to be about 70% based on centrifuge analysis. The visible absorption spectra of Fraction 6–1 exhibited a broad maximum in the 4200 A. region, most of which disappeared upon reduction with $Na_2S_2O_4$. The visible absorption spectra of Fraction 7–1 taken with material precipitated anaerobically with ammonium sulfate to remove contaminating emiquinoid flavoprotein, and desalted on a 1.3 x 9 cm. Bio-Gel $P_2$ column exhibited a broad absorption in the 3300 A. region, a peak at 4160 A. and absorption in 4600 A. region.

The ability of separated Fractions 6–1, 7–1 and recombined 6–1+7–1 to reduce nitrogen gas using the preferred system previously described is shown in the following table:

| Fraction: | Protein (mg.) | $N_2$ reduced (milligrams N/flask) | Sp. act.[1] |
|---|---|---|---|
| 6–1 | 1.39 | 0 | |
| 7–1 | 1.15 | 25 | |
| 6–1+7–1 | 1.15 | 123, 126 | 129 |
| 6–1 | 1.16 | 0 | |
| 7–1 | 0.75 | 30.4 | |
| 6–1+7–1 | 0.75 | 83.1, 82.5 | 131 |

[1] Based on mg. of Fraction 7–1 added.

The evolution of ammonia by Fractoin 7–1 alone is attributable to the small amount of Fraction 6–1 which tends to contaminate Fraction 7–1.

Experimental work related to the quantitative utilization of ATP established a requirement of 5 moles of ATP per electron pair. Thus, it has been established that 15 moles of ATP are needed per $N_2$ reduced to $NH_3$. Based on a free energy of hydrolysis of ATP of 7 Kcal./mole, 105 Kcal./mole are needed for reduction of $N_2$ to $NH_3$ when ATP is used as the phosphorylating agent in the system described.

These data are as follows:

| System | Micromoles $H_2$ | Micromoles Pi Obs. | Micromoles Pi Corr. | Pi:$H_2$ |
|---|---|---|---|---|
| 1. 0.77 mg. of 6–1 plus 0.50 mg. of 7–1 | 4.36 | 24.8 | 20.6 | 4.72 |
| 2. 0.77 mg. of 6–1 plus 0.50 mg. of 7–1 | 4.23 | 24.7 | 20.5 | 4.85 |
| 3. No. 1 less 6–1 | 1.33 | 9.0 | | |
| 4. No. 1 less 7–1 | 0 | 1.6 | | |
| 5. No. 1 less $S_2O_4^{--}$ | 0 | 4.2 | | |
| 6. Fraction 6–1, 7–1 (unseparated, 1.7 mg.) | 4.78 | 27.5 | 24.9 | 5.21 |
| 7. No. 6 less $S_2O_4^{--}$ | 0 | 2.6 | | |
| 8. No. 6 less Fractions 6–1, 7–1 | 0 | 0.8 | | |
| 9. Fraction 6–1, 7–1 (unseparated, 1.7 mg.) | 4.83 | 27.2 | 24.7 | 5.12 |
| 10. No 6 less $S_2O_4^{--}$ | 0 | 2.5 | | |
| 11. No. 6 less Fraction 6–1, 7–1 | 0 | 0.7 | | |

System as described previously for thirty minutes reaction time and atmosphere was argon.

The quantitative measurement of ATP used for $N_2$ reduction required correction for $H_2$ evolution even under one atmosphere of $N_2$. For the system previously described for a 30 minute reaction time using 2.8 mg. of Fractions 6–1, 7–1, the data was as follows with all values in micromoles:

| | | | | |
|---|---|---|---|---|
| $H_2$ evolved (corrected for $N_2$ uptake) | 3.53 | 3.56 | 3.79 | 3.75 |
| $N_2$ reduced | 2.32 | 2.27 | 2.22 | 2.29 |
| Total ATP used (Pi formed) | 51.0 | 51.6 | 51.9 | 53.0 |
| ATP used for $H_2$ evolution | 17.6 | 17.8 | 18.9 | 18.7 |
| ATP used for $N_2$ reduction | 33.4 | 33.8 | 33.0 | 34.3 |
| ATP used per $N_2$ reduced | 14.4 | 14.9 | 14.9 | 15.0 |
| ATP/2e | 4.80 | 4.97 | 4.97 | 5.0 |
| $H_2$ evolved/$N_2$ reduced | 1.52 | 1.57 | 1.71 | 1.64 |

Inorganic phosphate (Pi) was determined by the method described in J. Biol. Chem., 223, 377 (1956) for determination of Pi in the presence of creatine phosphate. Aliquots of the assay reactions were kept frozen until analysis, then thawed and 0.5 ml. of cold 0.6 trichloro acetic acid (TCA) was added and centrifuged to sediment the protein. 0.5 ml. of the supernatant was diluted with 3 ml. and aliquots diluted to 2 ml. with cold 0.05 MTCA and Pi determined colorimetrically.

Analysis of Fraction 6–1 indicated the presence of non-heme iron and molybdenum while Fraction 7–1 contained non-heme iron but no molybdenum except that attributed to carry-over from 6–1. Iron was determined as previously described, while molybdenum was determined using the dithiol reagent previously described, as follows: Samples were digested in 0.2 ml. of concentrated $H_2SO_4$ for fifteen minutes; decolorized using 0.1 ml. of 30% $H_2O_2$ and digested ½ hour to decompose excess $H_2O_2$. $H_2O$ (3 ml.), HCl (concentrated, 1.5 ml.) and 2 ml. of reagent were added, and the solution allowed to stand for ten minutes. Then 3 ml. isoamyl acetate added, mixed and allowed to stand twenty minutes. The isoamyl acetate layer was removed and absorbence was measured at 6800 A. with molybdenum content being obtained from a standard curve. The iron to molybdenum ratio of Fraction 6–1 was 11–12 to 1.

Ultracentrifuge analysis of Fraction 6B indicated a purity of about 95%, and if Fraction 6B is treated with 0.1 M NaCl and placed in an ultracentrifuge, there is an increase in the sedimentation constant value of the resultant refractive index gradients suggesting formation of dimer, trimer and tetramer forms. It was also observed that if Fraction 6B were exposed to an oxygen atmosphere, it becomes catalytically inactive. Introductory data indicate that if the oxidized material is treated on a polyacrylamide gel column having a molecular exclusion limit of 2000, the material coming through the column is free of molybdenum, indicating that molybdenum is removed from the catalyst by oxidation. Further analysis indicated the presence of an electron spin resonance signal of $g=0.02$ during the initial stages of oxidation, the signal disappearing in the final stages. Prestnce of a signal can be reversed by the addition of sulfhydril reagent such as DTT. This suggests that the molybdenum is bound to the protein by one or more sulfur atoms, some of which may be the source of the free radical observed by the $g=2.02$ signal during oxidation.

While the cacodylate buffers previously described are satisfactory, they produce volatile arsinic products probably both arsine and dimethyl arsine under the strong reducing conditions used for $N_2$ reduction. Also, the cacodylate buffers offer limited buffering capacity. It has been discovered that with $Na_2S_2O_4$ as the electron donor and the creatine kinase system to generate ATP, zwitterionic buffers with a pKa at or close to the optimum pH of this system offer more buffering capacity at reduced ionic strength. The zwitterionic materials used were:

(a) N-Tris (hydroxymethyl)methyl - 2-aminoethanesulfonic acid—TES
(b) N,N-Bis (2 - hydroxyethyl)-2-aminoethanesulfonic acid—BES
(c) N - 2 - hydroxyethyl-piperazine-N'-2-ethanesulfonic acid—HEPES The pKa at 20° C. and the change in pKa per degree C., respectively, were as follows:
TES—7.5 and −0.020
BES—7.15 and −0.016
HEPES—7.55 and −0.014

Optimal pH determination was made with a system including 200 micromoles of the zwitterionic buffer TES, 40 micromoles of sodium hydrosulfite ($Na_2S_2O_4$) as an electron donor, a phosphorylating agent generating system including 5 micromoles of $MgCl_2$, 120 micromoles of creatine phosphate, 0.5 milligram of creatine phosphokinase, 10 micromoles of ATP and a catalyst material including 1.26 mg. of Fraction 4B. The optimum pH for this system was 7.25 although the workable range extended from 6 to 8.

It was also observed that the creatine phosphate available from commercial sources sometimes contained heavy metal atoms such as barium which were inhibitory. Accordingly, improved results were obtained by using creatine phosphate free of barium or other heavy metals. This is easily accomplished by passing the creatine phosphate through an ion exchange column such as a Dowex 50 column.

Six electrons are required to reduce a molecule of nitrogen gas to ammonia and the organo-metallic catalyst is operative in the presence of an electron donor to bring about the necessary electron transfer to achieve reduction. While the mechanics of the electron transfer is not completely understood, it was shown that a posphorylating agent plays a role in this reaction.

A possible mechanism is that the phopshorylating agent brings about a conformational change in the catalyst resulting in alternation of an active site thereof which is believed to involve the non-heme iron. The conformational change possibly involves the spatial orientation of the active iron atoms so that the unfilled orbitals of the iron accept an electron pair from each nitrogen atom. Activation of $N_2$ molecules is presumably the result of a polarization induced by the reduction of at least one of the binding iron atoms. Molybdenum is believed to act as an electron transfer agent, although the possible role of molybdenum in inducing a polarization of the $N_2$ molecule is still a considered possibility. Subsequent reduction consists of a sequential transfer of electrons to the activated system.

Additional experimental work with Fractions 6 and 7 previously described indicated a synergistic effect when the catalyst system included both fractions. For example, Fraction 6 alone produced little, if any, ammonia from nitrogen gas, while Fraction 7 alone reduced 7.9 micromoles of nitrogen per minute per milligram protein of Fraction 7 and this reduction was probably due to the presence of a small amount of Fraction 6 which carried over into Fraction 7. Fraction 7 supplemented with Fraction 6 reduced 77.1 with micromoles of nitrogen gas per minute per milligram of Fraction 7. While the mechanism for the apparent synergistic action is not clear, these fractions play the role of binding site and electron transfer agent. The synergistic behavior of these two fractions indicates a possible role of ATP as a factor in bringing about a predetermined alignment of the catalyst molecules, and/or a conformational change in one or both so that the binding site is properly oriented with respect to the nitrogen atom and/or the electron transfer agent.

It has been observed that an excess amount of ATP tends to be inhibitory. For example, a 2 milliliter reaction mixture including the following: 50 micromoles of potassium cacodylate pH 7, 5 micromoles of $MgCl_2$, 12 micromoles of creatine phosphate, 40 micromoles

$Na_2S_2O_4$ 0.5 milligram of creatine phosphokinase and catalyst material was reacted to determine the effect of varying the amount of ATP and adenosine diphosphate (ADP). The presence of ATP and ADP in excess of about 5.0 millimoles in the above reaction mixture tended to be inhibitory. It was also observed that a pH of 7 appeared to be optimum, while tris acetate and tris maleate buffers reduced activity slightly.

Alternate procedures which may be used in the separation of the catalyst material of the present invention are as follows: rupture of the cells may include the use of a 10 kc. sonic oscillator, osmotic shock, or grinding the cells with glass beads or alumina.

Following centrifugation at 144,000×g, the active catalyst component may be sedimented by centrifugation of the supernatant at 144,000×g for six hours. This material may be fractionated as previously described or by using the procedures described below.

Nucleic acid may also be removed from Fraction 1 by treating it with streptomycin sulfate in a manner similar to that previously described in connection with the use of protamine sulfate.

Also, it is possible to separate Fraction 2 into its several components on an anion exchange column, although this type separation is not as complete as the preferred procedure previously described. Fraction 2 may also be separated by passing the protamine complex through a short column of cellulose phosphate to form the protamine-cellulose phosphate complex, the active material being recoverable as it passes through the column. The recovered material corresponds to Fraction 4.

An alternate procedure for the separation of Fraction 4 is as follows: Adjust the pH of Fraction 4 to 5.5 with argon-saturated 0.5 acetic acid solution to precipitate the impurities, and centrifuge the mixture to remove solid impurities. The supernatant is adjusted to pH 4.7 with an aqueous solution of 0.5 N acetic acid. This precipitates the active catalyst material. Centrifuge the mixture, and dissolve the solids in 0.25 M $K_2HPO_4$ of pH 7 to provide a solution of materials contained in Fractions 6 and 7.

In addition to the data previously given, visible and ultraviolet adsorption spectra of Fraction 6 indicated an adsorbence maxima with a peak at 2780 A. and a shoulder at 2900 A. The spectra shows a general decrease in adsorbence from 3000 A. to 7000 A., the decrease being rapid in the range of 3000 A. to 4800 A. The adsorbence in the range of 3000 A. to 7000 A. is devoid of distinguishable maxima or minima. Reduction with sodium hydrosulfite causes a decrease adsorbence in the range of 3800 A. to 7000 A. and indicates no distinguishable maxima or minima.

The adsorption spectra of Fraction 7 is essentially identical in the oxidized or reduced state of the above described spectra of Fraction 6.

While the present invention has been described with reference to catalyst derived Azotobacter, there is increasing evidence that essentially the same catalytically functional products are derivable from other $N_2$-fixing microorganisms, although the amino acid content may be different in minor respects. The separation on the DEAE cellulose column may be slightly different, but with some variation in procedure, the same catalytically functional products may be derived. Preliminary studies indicate essentially the same reduction reaction of these derived products, i.e., a phosphorylating agent, a synthetic electron donor ($N_2S_2O_2$) and the presence of iron and/or molybdenum in the active catalyst component.

Modifications may be made in carrying out the present invention without departing from the spirit and scope thereof and to the extent that these changes and modifications are within the purview of the annexed claims, they are to be considered as part of this invention.

What is claimed is:

1. The method for the production of ammonia from nitrogen gas comprising the steps of chemically reducing nitrogen gas to ammonia ions in the presence of a reaction system including a phosphorylating agent, an electron donor and an organo-metallic catalyst system free of a carbohydrate metabolizing system, said catalyst system derived from nitrogen fixing microorganisms and including as the essential ingredients a first and second organic nitrogenous material, the first material containing iron and molybdenum in the ratio of 11–12 to 1, said iron being non-heme iron, said first material having a molecular weight based on one atom of molybdenum per molecule in the range of 100,000 to 120,000, said second material containing non-heme iron and having a molecular weight based on two atoms of iron per molecule in the range of 30,000 to 40,000, and recovering substantially all the ammonia ions produced.

2. The method as set forth in claim 1 wherein the reduction reaction is carried out in a buffered aqueous medium and at atmospheric pressure and at temperatures below the decomposition temperature of said catalyst system, said first and second organic nitrogenous material being enzyme materials, and said phosphorylating agent being present in an amount sufficient for the electron donor to provide three electron pairs of each $N_2$ reduced to ammonia.

3. The method as set forth in claim 2 wherein the buffer for said aqueous medium is a zwitterionic material present in an amount sufficient to provide a pH in the range of 6 to 8.

4. The method as set forth in claim 3 wherein said zwitterionic material is selected from the group consisting of N-Tris (hydroxymethyl) methyl-2-aminoethanesulfonic acid; N,N-bis(2-hydroxyethyl)-2-aminoethanesulfonic acid; and N-2-hydroxyethylpiperazine-N'-2-ethanesulfonic acid.

5. The method as set forth in claim 1 wherein the reduction reaction is carried out in a buffered aqueous solution of pH in the range of 6 to 8.

6. The method as set forth in claim 4 wherein said pH is 7.25.

7. The method as set forth in claim 5 wherein said pH is 7.25.

8. The method as set forth in claim 2 wherein said phosphorylating agent is the reaction product of a generating system including $MgCl_2$, creatine phosphokinase, adenosine triphosphate and creatine phosphate which is essentially free of barium and other heavy metals.

9. The method as set forth in claim 2 wherein said phosphorylating agent is adenosine triphosphate present in an amount of 15 moles of per $N_2$ reduced to $NH_3$.

10. The method of deriving an active catalyst system for the reduction of nitrogen gas to ammonia from microorganisms grown on nitrogen gas, comprising the steps of rupturing the cells of said microorganisms to produce a crude extract including cellular and sub-cellular particulate components, solubilized protein and nucleic acids, separating from said crude extract the material smaller than that microscopically detectable and including at least in part a nucleic acid fraction and a mixture of proteins some of which have a net negative charge and others of which have a net positive charge, separating said nucleic acid fraction from said mixture of proteins, separating the proteins of net negative charge from those of net positive charge by the use of protamine sulfate, said proteins of net negative charge including a first and second enzyme material, said first enzyme material containing non-heme iron and molybdenum in the ratio of 11–12 to 1 and having a molecular weight based on one atom of molybdenum per molecule in the range of 100,000 to 120,000, said second enzyme material containing non-heme iron and having a molecular weight based on two atoms of iron per molecule in the range of 30,000 to 40,000, separating said proteins of net negative charges into separate fractions containing said first and second enzyme materials respectively by column chromatography, said fraction containing said first enzyme material also including material having a molecular weight of less than 10,000, treating said fraction containing said first enzyme to recover the portion thereof having a molecular weight greater than 10,000, and treating said recovered material by column chromatography to provide a composition containing said first enzyme and approximately 5% impurities, said last named composition and said second enzyme forming said active catalyst system.

References Cited

Good et al., Biochem., vol. 5, pp. 467–477, February 1966.

LIONEL M. SHAPIRO, Primary Examiner